(12) United States Patent
Lewis et al.

(10) Patent No.: US 7,092,884 B2
(45) Date of Patent: Aug. 15, 2006

(54) METHOD OF NONVISUAL ENROLLMENT FOR SPEECH RECOGNITION

(75) Inventors: James R. Lewis, Delray Beach, FL (US); Melanie D. Polkosky, Tampa, FL (US); Wallace J. Sadowski, Jr., Boynton Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 856 days.

(21) Appl. No.: 10/086,395

(22) Filed: Mar. 1, 2002

(65) Prior Publication Data

US 2003/0167169 A1 Sep. 4, 2003

(51) Int. Cl.
*G10L 15/00* (2006.01)
*G10L 15/06* (2006.01)
*G10L 13/00* (2006.01)
*G10L 13/08* (2006.01)

(52) U.S. Cl. ............... 704/243; 704/275; 704/260
(58) Field of Classification Search ............ 704/243, 704/235, 258, 260, 251, 246, 275, 270, 244
See application file for complete search history.

(56) References Cited

U.S. PATENT DOCUMENTS

| | | | |
|---|---|---|---|
| 5,483,924 A | 1/1996 | Whitaker | 119/713 |
| 5,569,038 A | 10/1996 | Tubman et al. | 434/308 |
| 5,820,384 A | 10/1998 | Tubman et al. | 434/308 |
| 5,883,341 A | 3/1999 | Terriss et al. | 181/141 |
| 5,950,167 A * | 9/1999 | Yaker | 704/275 |
| RE36,322 E | 10/1999 | Whitaker | 119/713 |
| 6,219,638 B1 | 4/2001 | Padmanabhan et al. | 704/235 |
| 6,324,507 B1 * | 11/2001 | Lewis et al. | 704/243 |
| 6,456,973 B1 * | 9/2002 | Fado et al. | 704/260 |
| 6,477,493 B1 * | 11/2002 | Brooks et al. | 704/246 |
| 6,687,604 B1 * | 2/2004 | Kato | 701/200 |
| 2002/0091519 A1 * | 7/2002 | Lewis et al. | 704/235 |

OTHER PUBLICATIONS

E. Spiller-Bosatra, et al., Audio-Phonological and Neuropsychological Aspects of Simultaneous Interpretation, *Scandinavian Audiology*, vol. 19, No. 2, pp. 81-87, (1990).

* cited by examiner

*Primary Examiner*—Richemond Dorvil
*Assistant Examiner*—Thomas Shortledge
(74) *Attorney, Agent, or Firm*—Akerman Senterfitt

(57) ABSTRACT

In a speech recognition system, a method of nonvisual enrollment comprising playing an audio representation of an enrollment script. As the enrollment is playing, shadowed speech from a user can be received, wherein the shadowed speech can lag the enrollment script. The received shadowed speech can be recorded for enrolling the user into the speech recognition system.

18 Claims, 2 Drawing Sheets

METHOD OF NONVISUAL ENROLLMENT FOR SPEECH RECOGNITION

BACKGROUND OF THE INVENTION

1. Technical Field

This invention relates to the field of speech recognition, and more particularly, to enrolling users in a speech recognition system.

2. Description of the Related Art

Speaker-dependent speech recognition systems (SRS) utilize a process called enrollment for processing user speech with improved accuracy. During enrollment, the user is asked to provide a speech sample to the SRS. Typically, the speech sample is derived from the user speaking a known body of text, called an enrollment script, into a microphone. The user speech sample can be processed to develop acoustic models tailored to the user. The acoustic models then can be used by the SRS to more accurately process subsequent speech from the user.

Users can be enrolled in a SRS using one of several different enrollment techniques. One enrollment technique involves the SRS presenting the user with text from an enrollment script. The user then reads the text aloud into a microphone. The SRS can record the speech for processing against the known enrollment script. Asking the user to read an enrollment script aloud, however, does have disadvantages. One such disadvantage is that reading can be difficult for users who have learning disabilities or for users who may not be proficient in reading. Additionally, reading an enrollment script requires a visual interface.

Another enrollment technique is to play portions of the enrollment script phrase by phrase through an audio interface. After each phrase is played, the user repeats the phrase back to the SRS. Thus, the user speech sample can be collected phrase by phrase until the user has dictated the entire enrollment script. The enrollment technique of iteratively playing a phrase and receiving user speech can be useful for users who are unable to read effectively or for users who must interact through an audio only interface. Still, in many cases, this enrollment technique increases the already significant enrollment time by a factor of two.

SUMMARY OF THE INVENTION

The invention disclosed herein provides a nonvisual method of enrolling users in a speech recognition system (SRS). More particularly, the invention utilizes a technique referred to as verbal shadowing to enroll users into a SRS using an audio interface. Verbal shadowing is a technique in which a subject repeats or echoes a spoken passage as the passage is heard by the subject. Thus, an enrollment script can be played to a user through an appropriate audio interface. As the user listens to the enrollment script, the user can repeat the script as it is played through the audio interface. In this manner, speech samples from the user can be collected for enrolling the user into the SRS.

One aspect of the present invention can include a method of enrolling a user in a SRS using an audio-only interface. The method can include playing an audio representation of an enrollment script. For example, a recording of a human voice dictating the enrollment script can be played or the enrollment script can be played using a text-to-speech system. As the enrollment script plays, shadowed speech can be received from a user. The shadowed speech can lag the enrollment script or can be received substantially simultaneously with the playing of the enrollment script. Additionally, as the enrollment script plays, the playback can be paused and/or resumed responsive to a user input.

The received shadowed speech can be recorded for enrolling the user in the SRS. The user can be enrolled in the SRS by constructing acoustic models based upon the received shadowed user speech and the enrollment script. Notably, the recording step can include receiving a speech sample including at least a predetermined minimum amount of shadowed user speech, and receiving additional shadowed user speech. A portion of the speech sample can be selectively replaced with a portion of the additional shadowed user speech. Alternatively, the recording step can include receiving a speech sample including more than a predetermined minimum amount of shadowed user speech, and selectively excluding a portion of the speech sample from the enrollment step.

Another embodiment of the present invention can include monitoring the received shadowed speech and the playing of the enrollment script, and selectively altering the playback speed of the enrollment script according to the monitoring step.

BRIEF DESCRIPTION OF THE DRAWINGS

There are shown in the drawings embodiments which are presently preferred, it being understood, however, that the invention is not so limited to the precise arrangements and instrumentalities shown.

DETAILED DESCRIPTION OF THE INVENTION

The invention disclosed herein provides a nonvisual method of enrolling users in a speech recognition system (SRS). More particularly, the invention utilizes a technique referred to as verbal shadowing or "echoing" to enroll users into a SRS through an audio interface. Verbal shadowing is a technique in which a subject attempts to repeat back, or echo, as quickly as possible, a spoken passage to which the subject is listening. According to the present invention, an enrollment script can be played to a user through an audio interface. As the user listens to the audio representation of the enrollment script, the user can shadow or echo the script as it is played. As the user repeats the enrollment script, the user speech samples can be collected for enrolling the user into the SRS. The user can be enrolled in the SRS once a suitable speech sample has been acquired.

Figure 1:
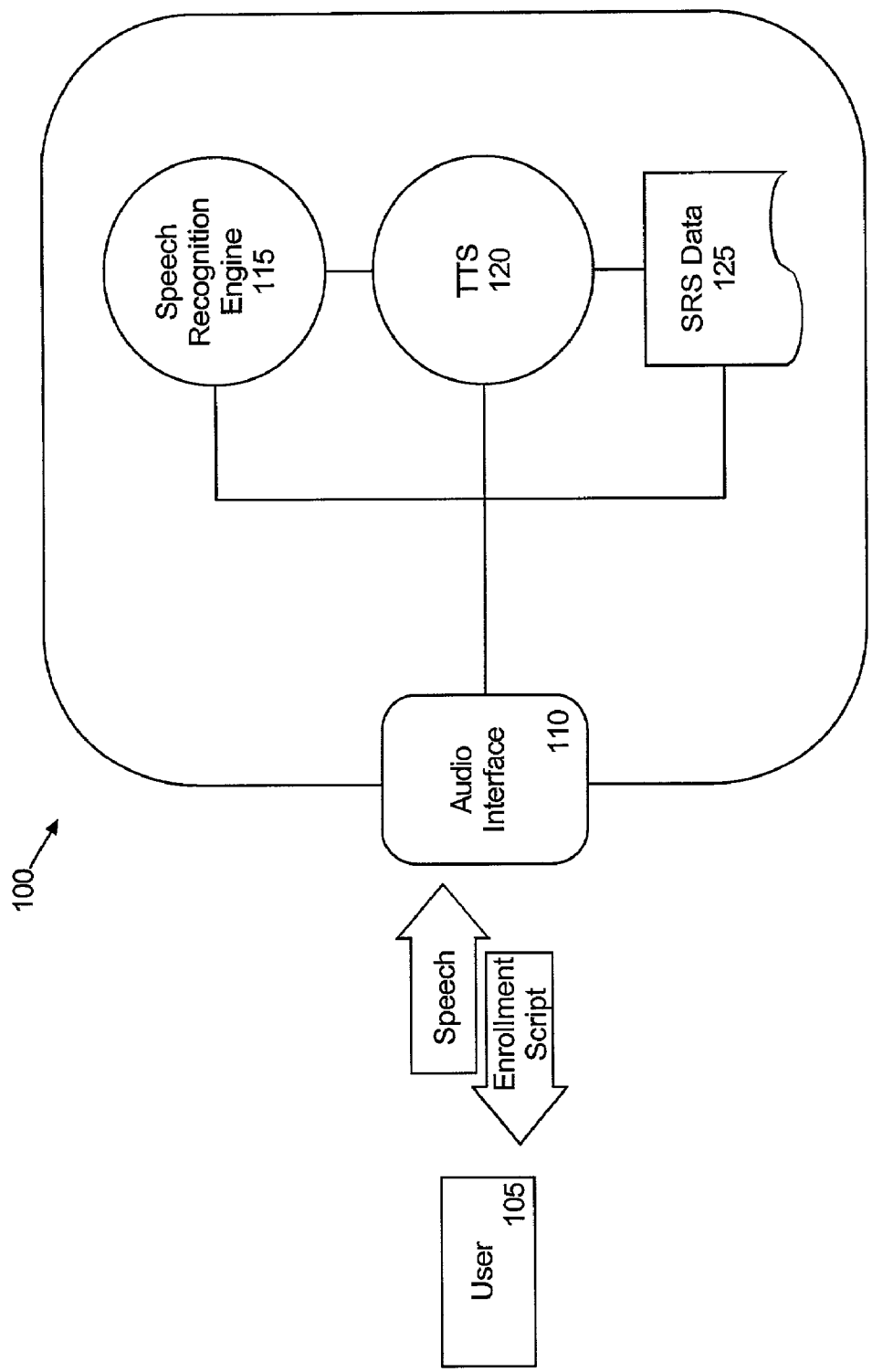
FIG. 1 is a schematic diagram illustrating an exemplary speech recognition system for enrolling a user in accordance with the inventive arrangements disclosed herein.

FIG. 1 is a schematic diagram illustrating an exemplary SRS 100 for enrolling a user 105 in accordance with the inventive arrangements disclosed herein. As shown in FIG. 1, the SRS 100 can include a speech recognition engine 115, a text-to-speech (TTS) system 120, SRS data 125, and an audio interface 110. The speech recognition engine 115, as is well known in the art, can convert digitized speech to text. For example, the speech recognition engine 115 can perform an acoustic analysis upon the digitized speech to identify one or more potential text or word candidates. The speech recognition engine 115 further can perform a contextual or linguistic analysis upon the potential word candidates to determine a final text representation of the digitized speech signal. Those skilled in the art will recognize that the speech recognition engine 115 further can construct acoustic models using speech samples provided by the user 105 during enrollment.

The SRS 100 optionally can include a TTS system 120. The TTS system 120, as is well known in the art, can convert text to speech. Accordingly, the TTS system 120 can play an enrollment script to the user 105. In the case where no TTS system 120 is included within the system 100, a recording of a human voice speaking the enrollment script can be played. Notably, the playback of the enrollment script, whether a recording or through TTS technology, can be coordinated by the speech recognition engine 115.

The SRS information 125 can include any necessary acoustic and linguistic models, as well as other information used by the speech recognition engine 115 in converting digitized speech to text. The SRS information 125 further can include any information and algorithms necessary for constructing acoustic models from a user enrollment. For example, the SRS information 125 can include, but is not limited to, one or more enrollment scripts, a recognizable vocabulary, valid speech command lists, and the like. Notably, in the case where no TTS system 120 is included within the SRS 100, the SRS data 125 can include recordings of a human voice dictating the enrollment script.

Regarding enrollment scripts, research conducted in the field of verbal shadowing can be used to design one or more suitable enrollment scripts. For example, research suggests that verbal shadowing is more easily performed by a user when using a simple, grammatical text. Also, it has been demonstrated that users typically cannot remember significant content from text the user has shadowed. Thus, the enrollment script can be constructed as simple grammatical text. Important information which the user is expected to remember, for example operational instructions regarding the SRS system, need not be included within the enrollment script as the user would not likely remember the information. Finally, verbal shadowing consumes a significant amount of user attention. Consequently, a user is unlikely to be able to perform complicated tasks, such as driving an automobile, while enrolling in a SRS using verbal shadowing.

The audio interface 115 can convert received sounds into electronic audio signals as well as convert audio output signals to sound. For example, the audio interface 115 can be a microphone/headset combination or a telephone handset or headset. Notably, any audio interface capable of separating output sound from received sound, at least to an acceptable degree of isolation, can be used. More specifically, as the user repeats an audible version of the enrollment script, any audio interface 115 which can isolate the audio output, i.e. through headphones or the like, such that the audio output does not substantially interfere with the audio input can be used. This can be specified as a predetermined signal-to-noise ratio. The degree of isolation need only be enough that the SRS 100 can accurately speech recognize the user's shadowing of the enrollment script. In one embodiment, for example, a directional microphone or microphone tuned to only detect audio sources within close proximity can be used in combination with external speakers. In that case, the user dictation of the enrollment script can be detected at suitable levels for high quality speech recognition, while the playing of the enrollment script through the speakers is not detected at a sufficient level that would result in poor quality speech recognition of the user dictation. The audio interface 115 further can include audio circuitry which can perform standard audio processing functions such as analog to digital signal conversions, digital to analog signal conversions, as well as other signal processing functions.

In operation, the user 105 can interact with SRS 100 to access any of a variety of speech-enabled applications or speech-based functions. The speech recognition engine 115, the TTS 120, the SRS data 125, as well as the audio interface 110 of the SRS 100 can be implemented within a computer system having suitable audio processing circuitry or a "sound card". Once a voice link has been established between the user 105 and the SRS 100, an enrollment script can be played to the user through the audio interface 110. For example, the enrollment script can be played from the computer system through a microphone/headset operatively connected to the computer system or from the computer system through a communications network such as the Internet or the public switched telephone network (PSTN), in which case the audio interface can be a telephone handset, headset, mobile phone, or the like.

As the user 105 listens to the enrollment script through the audio interface 110, the user 105 can begin to shadow or echo the enrollment script back into the audio interface 110. Research conducted in the field of verbal shadowing has shown that some subjects can sustain accurate shadowing at an average syllable duration of approximately 300 milliseconds. Other subjects have demonstrated an ability to nearly simultaneously shadow what the subject hears. Generally, however, most subjects perform verbal shadowing with delays of approximately 800 to 1,000 milliseconds. Thus, an acceptable amount of delay between the enrollment script playback and the user speech can be determined empirically such that users having different shadowing ability levels can be accommodated. Accordingly, the invention is not so limited to operating within the delay ranges disclosed herein.

The speech from user 105 can be recorded for subsequently enrolling the user 105 in the SRS 100. Regarding the quality of the user speech sample, research suggests that shadowed speech tends to be more monotone than normal speech. Notably, a conventional SRS does not model emotional content or intonational stress when constructing acoustic models. Thus, the quality of an enrollment produced using verbal shadowing can rival an enrollment produced from a reading of an enrollment script.

Figure 2:
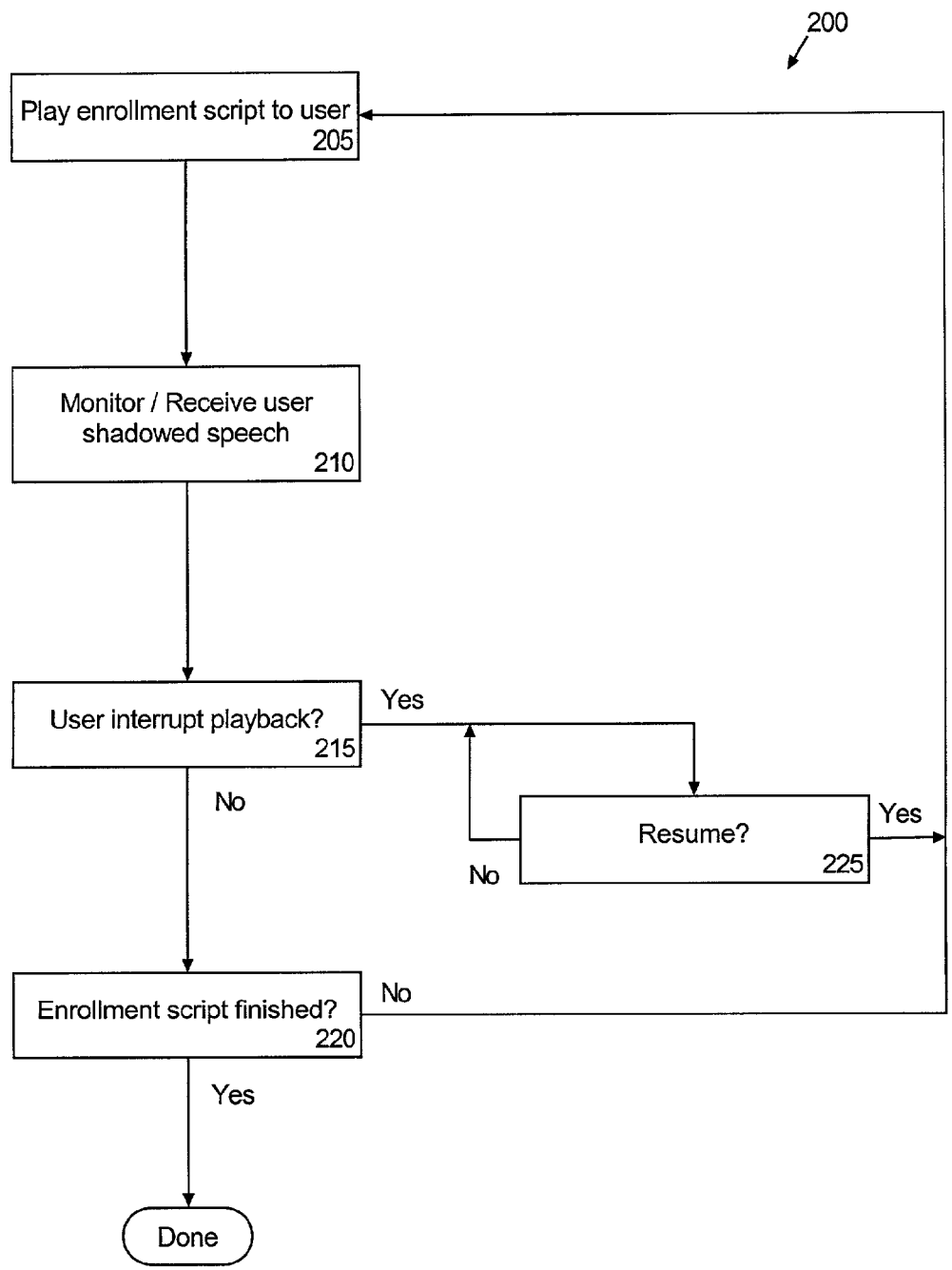
FIG. 2 is a flow chart illustrating a method of enrolling a user in a speech recognition system in accordance with one aspect of the inventive arrangements disclosed herein.

FIG. 2 is a flow chart illustrating a method 200 of enrolling a user in a SRS in accordance with one aspect of the inventive arrangements disclosed herein. The method can begin in a state where an enrollment session has been initiated between the user 105 and the SRS 100 of FIG. 1. Accordingly, the user 105 can be instructed to "verbally shadow" the enrollment script as it is played. Thus, the method 200 can begin in step 205 where the enrollment script can be played to the user. Notably, research suggests that subjects can shadow a recording of a human being speaking more effectively than various non-human sources or speech generation systems. Thus, preferably a recording of a human voice dictating the enrollment script can be played. Still, those skilled in the art will recognize that playing the enrollment script using TTS technology is not beyond the scope of the present invention. In any case, as the user begins to hear the enrollment script, the user can begin to repeat the enrollment script as the enrollment script continues to play.

In step 210, the shadowed speech from the user can be monitored and received. More specifically, the speech received from the user can be recorded. The shadowed user speech can be processed once a sample of the user speech has been acquired. A sample of user speech can include at least a predetermined minimum amount of user speech necessary for enrolling the user into the SRS. In one embodiment of the present invention, the playback speed of the enrollment script can be increased or decreased based upon the user's ability to effectively shadow the enrollment script. Accordingly, the user speech can be monitored to determine the delay between the enrollment script playback and the user speech. If the user becomes too far behind, whether measured in time or number of words, the playback of the enrollment script automatically can be slowed or momentarily paused. Conversely, the playback speed of the enrollment script can be increased if the user displays an ability to comfortably shadow the enrollment script. In an alternative embodiment, if the delay between the enrollment script playback and the user speech is larger than a predetermined maximum, the method can end and an error message can be provided to the user. In any case, the method can continue to step 215.

In step 215, a determination can be made as to whether the user has requested that the playback of the enrollment script be interrupted or paused. For example, the user can press a designated key such as the space key on a standard keyboard or an alphanumeric key, the "*" key, or the "#" key on a telephone, to pause the playback of the enrollment script. If the user has requested that the playback of the enrollment script be paused, the method can continue to step 225 where the method can continuously loop until the user requests that the playback of the enrollment script be resumed. For example, the user can activate another key or the same key that initiated the pause of the enrollment script playback. Once the user resumes playback of the enrollment script, the method can continue to step 205 to continue playing the enrollment script to the user and to repeat the method 200 as necessary.

If the user does not interrupt the playback of the enrollment script in step 215, the method can continue to step 220. In step 220, if the enrollment script has been completely played back to the user, the method can end. If not, however, the method can continue to step 205 to continue playing the enrollment script. From step 205, the method 200 can repeat as necessary.

In one embodiment of the present invention, portions of a user speech sample which do not adequately correspond to the enrollment script can be discarded in favor of additional user speech which more closely corresponds to the enrollment script. For instance, if the user speech sample includes more than the minimum amount of user speech, i.e. where the user has shadowed more enrollment script than was needed to properly enroll the user within the SRS, portions of the speech sample having a confidence score below a predetermined threshold can be excluded from the sample of the user speech to be used in the enrollment process, i.e. the generation of acoustic models. Portions of the excess speech collected during the enrollment process which more closely resemble the enrollment script, or have a confidence score greater than or equal to the predetermined threshold, can be used in place of the excluded speech.

Alternatively, any speech collected during the enrollment process having a confidence score above a predetermined threshold can be used to generate acoustic models while any speech from the enrollment process having a confidence below the threshold can be excluded from use during generation of acoustic models. Finally, in cases where a user has difficulty with verbal shadowing, the user can choose to enroll into the SRS by repeating the enrollment script phrase by phrase as the enrollment script is played to the user.

The present invention can be realized in hardware, software, or a combination of hardware and software. In addition, the present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other specific forms without departing from the spirit or essential attributes thereof. Accordingly, reference should be made to the following claims, rather than to the foregoing specification, as indicating the scope of the invention.

What is claimed is:

1. In a speech recognition system, a method of nonvisual enrollment comprising:
    playing an audio representation of an enrollment script;
    as said enrollment script is playing, receiving a speech sample comprising at least a predetermined minimum amount of shadowed speech from a user wherein said shadowed speech lags the enrollment script;
    receiving additional shadowed speech;
    selectively replacing a portion of said speech sample with a portion of said additional shadowed speech; and
    recording said received shadowed speech for enrolling the user into the speech recognition system.

2. The method of claim 1, further comprising:
    enrolling the user in the speech recognition system by constructing acoustic models based upon the enrollment script and said received shadowed speech.

3. The method of claim 1, wherein said playing step comprises:
    playing a recording of a human voice dictating the enrollment script.

4. The method of claim 1, wherein said playing step comprises:
    playing the enrollment script using a text-to-speech system.

5. The method of claim 1, further comprising:
    pausing said playing of the enrollment script responsive to a user input.

6. The method of claim 5, further comprising:
    resuming said playing of the enrollment script responsive to a user input.

7. The method of claim 1, further comprising:
    monitoring said received shadowed speech and said playing of said enrollment script; and
    selectively altering the playback speed of the enrollment script according to said monitoring step.

8. The method of claim 1, said receiving shadowed speech step further comprising;

receiving a speech sample comprising more than a predetermined minimum amount of shadowed user speech; and selectively excluding a portion of said speech sample from said enrollment step.

9. The method of claim 1, wherein said receiving shadowed speech step comprises:

receiving shadowed speech substantially simultaneously with said playing of the enrollment script.

10. A machine-readable storage, having stored thereon a computer program having a plurality of code sections executable by a machine for causing the machine to perform the steps of:

playing an audio representation of an enrollment script;

as said enrollment script is playing, receiving a speech sample comprising at least a predetermined minimum amount of shadowed speech from a user wherein said shadowed speech lags the enrollment script;

receiving additional shadowed speech;

selectively replacing a portion of said speech sample with a portion of said additional shadowed speech; and recording said received shadowed speech for enrolling the user into the speech recognition system.

11. The machine-readable storage of claim 10, further comprising:

enrolling the user in the speech recognition system by constructing acoustic models based upon the enrollment script and said received shadowed speech.

12. The machine-readable storage of claim 10, wherein said playing step comprises:

playing a recording of a human voice dictating the enrollment script.

13. The machine-readable storage of claim 10, wherein said playing step comprises:

playing the enrollment script using a text-to-speech system.

14. The machine-readable storage of claim 10, further comprising:

pausing said playing of the enrollment script responsive to a user input.

15. The machine-readable storage of claim 14, further comprising:

resuming said playing of the enrollment script responsive to a user input.

16. The machine-readable storage of claim 10, further comprising;

monitoring said received shadowed speech and said playing of said enrollment script; and selectively altering the playback speed of the enrollment script according to said monitoring step.

17. The machine-readable storage of claim 11, said receiving shadowed speech step further comprising:

receiving a speech sample comprising more than a predetermined minimum amount of shadowed user speech; and selectively excluding a portion of said speech sample from said enrollment step.

18. The machine-readable storage of claim 10, wherein said receiving shadowed speech step comprises:

receiving shadowed speech substantially simultaneously with said playing of the enrollment script.

* * * * *